3,773,824
3-(4-METHYL-3-CYCLOHEXENYL)BUTYL
ESTERS OF ORGANIC ACIDS
Jerry G. Strong, Westfield, N.J., assignor to
Mobil Oil Corporation
No Drawing. Filed June 14, 1971, Ser. No. 153,057
Int. Cl. C07c 69/66
U.S. Cl. 260—484 R
3 Claims

ABSTRACT OF THE DISCLOSURE 3-(4-methyl-3-cyclohexenyl)butyl esters form a class of compounds exhibiting fungicidal and plant growth regulant activity, and, of which, certain 3-(4-methyl-3-cyclohexenyl)butyl esters of substituted acetic acids are novel compounds. In fungicide tests, the compounds of this invention are effective against *Fusarium oxysporium, Pythium debaryanum, Rhizoctonia solani* and *Sclerotium rolfsii*. In herbicide tests, post-emergent application of the compounds of this invention provides plant growth regulant action, such as cotton defoilation and chemical pinching.

CROSS-REFERENCE TO RELATED APPLICATION

U.S. application S.N. 153,058, filed on the same date herewith, and entitled, 3-(4-methyl-3-cyclohexenyl)butyl esters and epoxidized derivatives thereof as insect juvenile hormone mimicking compounds and insecticides, relates to use of certain 3-(4-methyl-3-cyclohexenyl)butyl esters for insect control.

BACKGROUND OF THE INVENTION

Field of the invention

This invention is directed to the use of certain 3-(4-methyl-3-cyclohexenyl)butyl esters as fungicides and plant growth regulants. It is further directed to a certain group of such esters, namely the 3-(4-methyl-3-cyclohexenyl) butyl esters of substituted acetic acids, which are novel compounds useful as fungicides and plant growth regulants.

Description of the prior art 3-(4-methyl-3-cyclohexenyl)butyl esters of acetic acids substituted in the alpha-position with hydrogen and simple alkyl radicals are disclosed in U.S. Pat. No. 2,556,150 as compounds having desirable and persistent odors. Examples of these compound are the 3-(4-methyl-3-cyclohexenyl)butyl esters of acetic acid, propionic acid, butyric acid, and cyclopropane and cyclohexane carboxylic acids.

French Pat. No. 2,007,187 discloses certain specific derivatives of cyclohexene as insecticides.

SUMMARY OF THE INVENTION

This invention provides for use as fungicides and plant growth regulants compounds selected from the group consisting of (1) a compound of the following formula:

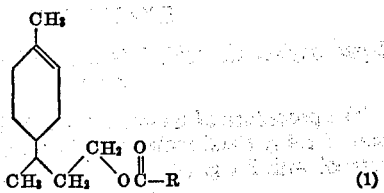

wherein R is a member selected from the group consisting of alkyl of 1–6 carbon atoms and cycloalkyl of 3–6 carbon atoms, and (2) a compound of the following formula:

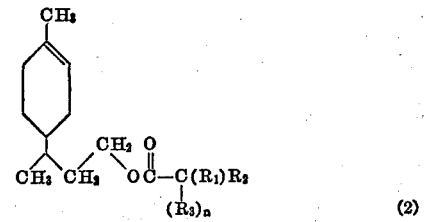

wherein $R_1$ and $R_2$ are selected from the group consisting of hydrogen, halogen (e.g., fluorine, chlorine and bromine), nitro, alkoxy of 1–4 carbon atoms, phenoxy, substituted phenoxy, haloalkyl of 1–4 carbon atoms, aryl, aroyl, acetyl, cyano, alkylmercapto of 1–4 carbon atoms, mercapto, hydroxy, carbalkoxy of 2–4 carbon atoms, carboxy, alkylamino of 1–4 carbon atoms, amide, alkyl of 1–6 carbon atoms, alkenyl of 2–6 carbon atoms, cycloalkyl of 3–6 carbon atoms, epoxyalkyl of 2–6 carbon atoms, $=CR_4R_5$ and combinations thereof, and wherein $R_1$ and $R_2$ may be a part of an aromatic homocyclic ring, aromatic heterocyclic ring, a saturated homocyclic ring or a saturated heterocyclic ring, and wherein $R_3$ is selected from the group consisting of halogen (e.g., fluorine, chlorine and bromine), nitro, alkoxy of 1–4 carbon atoms, phenoxy, substituted phenoxy, haloalkyl of 1–4 carbon atoms, aryl, aroyl, acetyl, cyano, alkylmercapto of 1–4 carbon atoms, mercapto, hydroxy, carbalkoxy of 2–4 carbon atoms, carboxy, alkylamino of 1–4 carbon atoms, amide, alkenyl of 2–6 carbon atoms, epoxyalkyl of 2–6 carbon atoms and cycloalkyl of 3–6 carbon atoms, $R_4$ and $R_5$ are selected from the group consisting of hydrogen, alkyl of 1–5 carbon atoms and aryl, $n$ is an integer of 1 or 0, and $n$ is the integer 0 when $R_1$ or $R_2$ is $=CR_4R_5$.

The invention also embodies, as novel compounds, the compounds of the Formula 2 set forth hereinbefore.

DESCRIPTION OF SPECIFIC EMBODIMENTS

Non-limiting examples of the compounds of Formula 1 include:

Acetic acid, 3-(4-methyl-3-cyclohexenyl)butyl ester;
Propionic acid, 3-(4-methyl-3-cyclohexenyl)butyl ester;
Butyric acid, 3-(4-methyl-3-cyclohexenyl)butyl ester;
Iso-butyric acid, 3-(4-methyl-3-cyclohexenyl)butyl ester;
Pivalic acid, 3-(4-methyl-3-cyclohexenyl)butyl ester;
Cyclopropanecarboxylic acid, 3-(4-methyl-3-cyclohexenyl)butyl ester;
Cyclohexanecarboxylic acid, 3-(4-methyl-3-cyclohexenyl)butyl ester.

Non-limiting examples of the compounds of Formula 2 include:

2-chloroacetic acid, 3-(4-methyl-3-cyclohexenyl)butyl ester;
2,2-dichloroacetic acid, 3-(4-methyl-3-cyclohexenyl)butyl ester;
2,2,2-tribromoacetic acid, 3-(4-methyl-3-cyclohexenyl) butyl ester;
2-nitropropionic acid, 3-(4-methyl-3-cyclohexenyl)butyl ester;
2-methoxybutyric acid, 3-(4-methyl-3-cyclohexenyl)butyl ester;

2-butoxyacetic acid, 3-(4-methyl-3-cyclohexenyl)butyl ester;
2,2-dimethoxyacetic acid, 3-(4-methyl-3-cyclohexenyl) butyl ester;
2-phenoxyacetic acid, 3-(4-methyl-3-cyclohexenyl)butyl ester;
2-(2,4-dichlorophenoxy)acetic acid, 3-(4-methyl-3-cyclohexenyl)butyl ester;
2-(2-methyl-4-chlorophenoxy)acetic acid, 3-(4-methyl-3-cyclohexenyl)butyl ester;
2-(2-methyl-3,4-dichlorophenoxy)acetic acid, 3-(4-methyl-3-cyclohexenyl)butyl ester;
3-chloropropionic acid, 3-(4-methyl-3-cyclohexenyl) butyl ester;
2,3-dichlorobutyric acid, 3-(4-methyl-3-cyclohexenyl) butyl ester;
2,2-diphenylacetic acid, 3-(4-methyl-3-cyclohexenyl)butyl ester;
2-benzoylacetic acid, 3-(4-methyl-3-cyclohexenyl)butyl ester;
2-acetylacetic acid, 3-(4-methyl-3-cyclohexenyl)butyl ester;
2-cyanopropionic acid, 3-(4-methyl-3-cyclohexenyl)butyl ester;
2-methylthioacetic acid, 3-(4-methyl-3-cyclohexenyl) butyl ester;
2-ethylthiobutyric acid, 3-(4-methyl-3-cyclohexenyl)butyl ester;
2-mercaptopropionic acid, 3-(4-methyl-3-cyclohexenyl) butyl ester;
2-hydroxyacetic acid, 3-(4-methyl-3-cyclohexenyl)butyl ester;
2-carbomethoxyacetic acid, 3-(4-methyl-3-cyclohexenyl) butyl ester;
3-carboethoxypropionic acid, 3-(4-methyl-3-cyclohexenyl)butyl ester;
2-carboxyacetic acid, 3-(4-methyl-3-cyclohexenyl)butyl ester;
2-dimethylaminoacetic acid, 3-(4-methyl-3-cyclohexenyl) butyl ester;
2-dimethylamidopropionic acid, 3-(4-methyl-3-cyclohexenyl)butyl ester;
2-methylacrylic acid, 3-(4-methyl-3-cyclohexenyl)butyl ester;
Crotonic acid, 3-(4-methyl-3-cyclohexenyl)butyl ester;
Cinnamic acid, 3-(4-methyl-3-cyclohexenyl)butyl ester;
3-butenoic acid, 3-(4-methyl-3-cyclohexenyl)butyl ester;
5-norbornene-2-carboxylic acid, 3-(4-methyl-3-cyclohexenyl)butyl ester;
2,2-dimethyl-3-butenoic acid, 3-(4-methyl-3-cyclohexenyl)butyl ester;
3-chlorocrotonic acid, 3-(4-methyl-3-cyclohexenyl)butyl ester;
2,3-dichlorocrotonic acid, 3-(4-methyl-3-cyclohexenyl) butyl ester;
Furoic acid, 3-(4-methyl-3-cyclohexenyl)butyl ester;
Tetrahydrofuroic acid, 3-(4-methyl-3-cyclohexenyl)butyl ester;
2-methoxycyclohexanecarboxylic acid, 3-(4-methyl-3-cyclohexenyl)butyl ester;
Benzoic acid, 3-(4-methyl-3-cyclohexenyl)butyl ester;
Naphthoic acid, 3-(4-methyl-3-cyclohexenyl)butyl ester;
2-cyano-2-chloropropionic acid, 3-(4-methyl-3-cyclohexenyl)butyl ester;
2-chloro-2-phenylacetic acid, 3-(4-methyl-3-cyclohexenyl)butyl ester;
2,3-epoxypropionic acid, 3-(4-methyl-3-cyclohexenyl) butyl ester;
2,3-epoxyisobutyric acid, 3-(4-methyl-3-cyclohexenyl) butyl ester.

Compounds of the structure of Formula 2 may be prepared by, for example, the following general Procedure I:

Procedure I 3-(4-methyl-3-cyclohexenyl)butanol and an appropriately substituted carboxylic acid halide are mixed in a suitable solvent, if desired, and with a suitable acid accepting agent, if desired. Non-limiting examples of solvents for use in this procedure include ethyl ether, benzene, toluene, hexane, heptane, and chloroform. Non-limiting examples of acid accepting agents for use in this procedure include trialkylamines, arylamines, pyridine and sodium carbonate. The resulting mixture is stirred and heated, if desired, for an appropriate time, and then washed with water, dried and evaporated to yield the desired product.

Various compounds of the structure of Formula 2 also can be prepared using alternate procedures as, for example, are indicated in Procedures II and III below.

Procedure II 3-(4-methyl-3-cyclohexenyl)butanol is condensed by acid catalyzation with an appropriately substituted carboxylic acid in a suitable inert solvent, if a solvent is desired. Water is removed as a by-product. Non-limiting examples of acid catalysts for use in this procedure include hydrochloric acid, sulfuric acid, p-toluenesulfonic acid and phosphoric acid. Non-limiting examples of solvents for use in this procedure include toluene, benzene and xylene.

Procedure III 3-(4-methyl-3-cyclohexenyl)butanol is condensed with an appropriately substituted acetic acid anhydride, non-limiting examples of which are a cyclic anhydride such as, for example, succinic anhydride, and a non-cyclic anhydride such as, for example, 2-chloroacetic anhydride.

The following specific examples demonstrate the above typical procedures. Examples 1–5 and 14 utilize above Procedure II. Examples 6–8 and 10–13 utilize above Procedure I. Example 9 utilizes above Procedure III.

The compounds of above Formula 1 for use in this invention may be prepared according to procedures outlined in hereinbefore mentioned U.S. Pat. No. 2,556,150.

EXAMPLE 1

Succinic acid, 3-(4-methyl-3-cyclohexenyl)butyl methyl ester

A solution of 13.2 g. (0.1 mole) of methyl succinate and 16.8 g. (0.1 mole) of 3-(4-methyl-3-cyclohexenyl) butanol in 250 ml. of benzene containing 0.2 g. of p-toluenesulfonic acid was heated to reflux until the liberation of water which was collected in a water trap ceased. The reaction solution was cooled, washed with 5% sodium hydroxide and with brine, dried over magnesium sulfate and concentrated. The resulting liquid was distilled through a short path apparatus to afford 17.1 g. of pure succinic acid, 3-(4-methyl - 3 - cyclohexenyl) butyl methyl ester, with a boiling point of 134–139° C. (0.1 mm.) (see Table I).

EXAMPLE 2

Chloroacetic acid, 3-(4-methyl-3-cyclohexenyl)butyl ester

The procedure of Example 1 was followed for the reaction of 10.0 g. (0.06 mole) of 3-(4-methyl-3-cyclohexenyl)butanol with 5.7 g. (0.06 mole) of chloroacetic acid. Obtained following distillation was 12.1 g. of pure chloroacetic acid, 3-(4-methyl-3-cyclohexenyl)butyl ester, with a boiling point of 116–118° C. (0.3 mm.) (see Table I).

EXAMPLE 3

2-phenoxybutyric acid, 3-(4-methyl-3-cyclohexenyl)butyl ester

The procedure of Example 1 was followed for the reaction of 8.4 g. (0.05 mole) of 3-(4-methyl-3-cyclohexenyl) butanol with 9.1 g. (0.5 mole) of 2-phenoxybutyric acid.

Obtained following distillation was 12.8 g. of pure 2-phenoxybutyric acid, 3-(4-methyl-3-cyclohexenyl)butyl ester, with a boiling point of 154–162° C. (0.07 mm.) (see Table I).

EXAMPLE 4

Ethoxyacetic acid, 3-(4-methyl-3-cyclohexenyl)butyl ester

The procedure of Example 1 was followed for reaction of 10.0 g. (0.06 mole) of 3-(4-methyl-3-cyclohexenyl)butanol with 6.3 g. (0.06 mole) of ethoxyacetic acid in 250 ml. of toluene. Obtained following distillation was 12.7 g. of pure ethoxyacetic acid, 3-(4-methyl-3-cyclohexenyl)butyl ester, with a boiling point of 120–124° C. (0.3 mm.) (see Table I).

EXAMPLE 5

2-furoic acid, 3-(4-methyl-3-cyclohexenyl)butyl ester

The procedure of Example 1 was followed for the reaction of 6.7 g. (0.06 mole) of 3-(4-methyl-3-cyclohexenyl)butanol with 6.7 g. (0.06 mole) of 2-furoic acid in 200 ml of toluene. Obtained following distillation was 11.0 g. of pure 2-furoic acid, 3-(4-methyl-3-cyclohexenyl)butyl ester, with a boiling point of 136–144° C. (0.1 mm.) (see Table I).

EXAMPLE 6

Methoxyacetic acid, 3-(4-methyl-3-cyclohexenyl)butyl ester

A solution of 16.8 g. (0.1 mole) of 3-(4-methyl-3-cyclohexenyl)butanol in 20 ml. of ethyl ether was added dropwise over 15 minutes to a stirred, cooled solution of 15.8 g. (0.1 mole) of methoxyacetyl chloride and 10 g. (0.1 mole) of triethylamine in 150 ml. of ethyl ether. The reaction mixture was stirred at room temperature for 3 hours before the precipitated salts were removed by filtration and the organic filtrate was washed with 5% sodium hydroxide and with brine, dried over magnesium sulfate and concentrated. The remaining liquid was distilled through a short path apparatus to afford 3.0 g. of starting 3-(4-methyl-3-cyclohexenyl)butanol followed by 13.3 g. of pure ethoxyacetic acid, 3-(4-methyl-3-cyclohexenyl)butyl ester, with a boiling point of 110–112° C. (0.3 mm.) (see Table I).

EXAMPLE 7

Trans-chrysanthemumic acid, 3-(4-methyl-3-cyclohexenyl)(butyl ester

The procedure of Example 6 was followed for the reaction of 5.0 g. (0.03 mole) of 3-(4-methyl-3-cyclohexenyl)butanol with 5.6 g. (0.03 mole) of trans-chrysanthemumic acid chloride and 6.1 g. (0.06 mole) of triethylamine. Obtained with 8.6 g. of pure trans-chrysanthemumic acid, 3-(4-methyl-3-cyclohexenyl)butyl ester as a clear, yellow liquid (see Table I).

EXAMPLE 8

Trichloroacetic acid, 3-(4-methyl-3-cyclohexenyl)butyl ester

The procedure of Example 6 was followed for the reaction of 10.0 g. (0.06 mole) of 3-(4-methyl-3-cyclohexenyl)butanol with 10.9 g. (0.06 mole) of trichloroacetyl chloride and 12.2 g. (0.12 mole) of triethylamine. Obtained was 15.0 g. of pure trichloroacetic acid, 3-(4-methyl-3-cyclohexenyl)butyl ester as a clear, colorless liquid (see Table I).

EXAMPLE 9

Succinic acid, 3-(4-methyl-3-cyclohexenyl)butyl ester

A mixture of 58.8 g. (0.35 mole) of 3-(4-methyl-3-cyclohexenyl)butanol and 40 g. (0.4 mole) of succinic anhydride was stirred and heated to 225° C. for 30 minutes. The cooled mixture was mixed with 100 ml. of ethyl ether and the insoluble excess succinic anhydride was removed by filtration. The filtrate was concentrated to afford 93.8 g. of pure succinic acid, 3-(4-methyl-3-cyclohexenyl)butyl ester as a clear, viscous liquid (see Table I).

EXAMPLE 10

Acetic acid, 3-(4-methyl-3-cyclohexenyl)butyl ester

The procedure of Example 6 was followed for the reaction of 11.8 g. (0.07 mole) of 3-(4-methyl-3-cyclohexenyl)butanol with 7.0 g. (0.08 mole) of acetyl chloride and 8.1 g. (0.08 mole) of triethylamine in 200 ml. of ethyl ether. Obtained following distillation was 11.8% of pure acetic acid, 3-(4-methyl-3-cyclohexenyl)butyl ester as a clear, colorless liquid, with a boiling point of 83–86° C. (0.35 mm.) (see Table I).

EXAMPLE 11

Cyclopropanecarboxylic acid, 3-(4-methyl-3-cyclohexenyl)butyl ester

A 30 ml. solution of 6.4 g. (0.06 mole) of cyclopropanecarboxylic acid chloride in ethyl ether was added dropwise to a stirred solution of 10.0 g. (0.06 mole) of 3-(4-methyl-3-cyclohexenyl)butanol and 12.2 g. (0.12 mole) of triethylamine in 150 ml. of ethyl ether. After stirring overnight at ambient temperature, the precipitated salts were removed by filtration and the filtrate was washed with 5% sodium hydroxide and with brine, dried over magnesium sulfate and concentrated. The liquid residue was distilled through a short path apparatus to afford 8.4 g. of pure cyclopropanecarboxylic acid, 3-(4-methyl-3-cyoyhexenyl)butyl ester as a clear, colorless liquid with a boiling point of 132–135° C. at 0.5 mm. (see Table I).

EXAMPLE 12

Pivalic acid, 3-(4-methyl-3-cyclohexenyl)butyl ester

The procedure of Example 6 was followed for the reaction of 10.0 g. (0.06 mole) of 3-(4-methyl-3-cyclohexenyl)butanol with 7.3 g. (0.06 mole) of pivaloyl chloride and 12.2 g. (0.12 mole) of triethylamine in 250 ml. of ether. Obtained following distillation was 6.1 g. of pure pivalic acid, 3,4-methyl-3-cyclohexenyl)butyl ester as a clear, colorless liquid with a boiling point of 95–102° C. (0.25 mm.) (see Table I).

EXAMPLE 13

Crotonic acid, 3-(4-methyl-3-cyclohexenyl)butyl ester

The procedure of Example 6 was followed for the reaction of 16.8 g. (0.1 mole) of 3-(4-methyl-3-cyclohexenyl)butanol with 11.0 g. (0.1 mole) of crotonyl chloride and 11.1 g. (0.11 mole) of triethylamine in 250 ml. of ethyl ether. Obtained following distillation was 7.8 g. of pure crotonic acid, 3-(4-methyl-3-cyclohexenyl)butyl ester, as a clear, colorless, liquid, with a boiling point of 97–101° C. (0.2 mm.) (see Table I).

EXAMPLE 14

Methacrylic acid, 3-(4-methyl-3-cyclohexenyl)butyl ester

The procedure of Example 1 was followed for the reaction of 33.6 g .(0.2 mole) of 3-(4-methyl-3-cyclohexenyl)butanol with 17.2 g. (0.2 mole) of methacrylic acid and 0.2 g. of p-toluenesulfonic acid in 250 ml. of benzene. Obtained following distillation was 10.4 g. of pure methacrylic acid, 3-(4-methyl-3-cyclohexenyl)butyl ester as a clear, colorless liquid, with a boiling point of 98–104° C. (0.25 mm.) (see Table I).

TABLE I.—INFRARED, NUCLEAR MAGNETIC RESONANCE AND MASS SPRECTRA OF THE COMPOUNDS OF EXAMPLES 1-14

| Compound of example— | IR[λ(max.) microns] film | NMR[δ in p.p.m. (nH, pattern)] | MS (molecular ion) |
|---|---|---|---|
| 1 | 3.6(s.), 5.8(s.), 7.1(m.), 8.7(s.), 11.0(w.), 12.5(m.) | 5.31(1H, m.), 4.10(2H, t.), 3.65(3H, s.), 2.60(4H, s.) | 282 |
| 2 | 3.6(s.), 5.8(s.), 6.9(m.), 8.6(s.), 12.5(m.) | 5.31(1H, m.), 4.19 (2H,t.), 4.0(2H, s.) | 244 |
| 3 | 3.5(s.), 5.8(s.), 6.8(s.), 8.2(s.), 13.2(s.) | 7.3 to 6.7(5H, m.), 5.29(1H, m.), 4.5(1H, t.), 4.11 (2H, t.) | 330 |
| 4 | 3.5(s.), 5.7(s.), 6.9(m.), 8.4(s.), 8.8(s.), 12.4(m.) | 5.30(1H, m.), 4.15(2H, t.), 4.0(2H, s.), 3.54(2H, q.) | 254 |
| 5 | 3.6(s.), 5.9(s.), 6.8(m.), 7.8(s.), 8.6(m.), 9.0(s.), 13.1(s.) | 7.99(1H, t.), 7.08(1H, d.), 6.40(1H, q.), 5.29(1H, m.), 4.27(2H, t.) |  |
| 6 | 3.5(s.), 5.8(s.), 6.9(s.), 8.4(s.), 8.9(s.), 12.5(m.) | 5.30(1H, m.), 4.15(2H, t.), 3.96(2H, s.), 3.90(3H, s.) | 240 |
| 7 | 3.5(s.), 5.8(s.), 6.9(m.), 8.6(s.), 11.8(m.) | 5.30(1H, m.), 4.85(1H, d.), 4.05(2H, t.) | 318 |
| 8 | 3.5(s.), 5.7(s.), 6.9(m.), 8.1(s.), 10.2(m.), 12.1(s.) | 5.28(1H, m.), 4.31(2H, t.) | 314 |
| 9 | 3.3(m.), 3.5(s.), 5.8(s.), 7.0(m.), 8.6(s.), 12.4(m.) | 9.17(1H, m.), 5.30(1H, m.), 4.08(2H, t.), 2.60(4H, s.) | 268 |
| 10 | 3.5(s.), 5.7(s.), 6.8(m.), 8.1(s.), 9.5(m.) | 5.30(1H, m.), 4.10(2H, t.), 1.99(3H, s.) | 210 |
| 11 | 3.5(s.), 5.8(s.), 6.9(m.), 8.6(s.), 12.5(m.) | 5.31(1H, m.), 4.11(2H, t.), 0.90(5H, m.) | 236 |
| 12 | 3.5(s.), 5.8(s.), 6.9(m.), 8.7(s.), 12.4(m.) | 5.29(1H, m.), 4.05(2H, t.) | 252 |
| 13 | 3.6(s.), 5.9(s.), 7.0(m.), 8.7(s.), 12.4(m.) | 6.88(1H, m.), 5.82(1H, m.), 5.30(1H, m.), 4.08(2H, t.) | 236 |
| 14 | 3.5(s.), 5.9(s.), 6.9(m.), 8.7(s.), 12.5(m.) | 6.02(1H, m.), 5.48(1H, t.), 5.30(1H, m.), 4.13(2H, t.) | 236 |

In the illustration of the utility of this invention, the compounds of the examples were subjected to tests for fungicidal activity and plant growth regulant activity according to the following test descriptions. The results of said tests are set forth in Tables II and III following the descriptions.

FUNGICIDE TESTING METHOD

Four representative soil fungi, *Fusarium oxysporium, Pythium debaryanum, Rhizoctonia solani* and *Sclerotium rolfsii*, are maintained on potato dextrose agar in 20 x 150 mm. test tubes. Inoculum for the test is increased in a 1000 ml. Erlenmeyer flask on a ¼ corn meal-¾ sand mixture (by volume). The medium is saturated with water and sterilized by autoclaving at 15 lbs. pressure for 20 minutes on two successive days. The medium is inoculated by transferring, aseptically, a small portion of mycelium from the test tube cultures 14 days prior to using for inoculum.

An inoculated medium for each of the four soil organisms is prepared as follows: A 14-day old 1000 ml. flask of the corn meal-sand inoculum is used to inoculate 20 10-oz cups of sterile soil by blending the inoculum and sterile soil for 10 minutes in the cement mixer.

The inoculated medium is then placed in 10 oz. wax treated cold drink cups (20 cups of each organism) and treated as follows: 150 mg. quantity of each candidate fungicide is weighed on the analytical balance and formulated using 10 ml. of acetone and 190 ml. of $H_2O$. A 50 ml. quantity of each chemical formulation is used to drench 1 cup inoculated with each of the four fungal organisms. Immediately after the cups are drenched, they are placed in polyethylene bags (1 cup per bag) and held at 70° F. for fourteen days.

After ten days, each cup is examined for the presence of fungal growth and each compound rated for percent inhibition of fungal growth.

PLANT GROWTH REGULANT TESTING METHOD

The test species propagated for testing is cotton. Each cotton species is planted individually in 3-inch plastic pots containing potting soil. Four seeds of the cotton are seeded to a depth equal to the diameter of the seed. Immediately after planting, all pots are watered by sub-irrigation in greenhouse trays.

Spray applications of test compounds are made in a hood containing a movable belt and fixed spray nozzle. Treatments are moved to the greenhouse after spraying. Watering during the observation period is accomplished only by sub-irrigation.

Compounds are screened at rates of application equivalent to 16 and 8 pounds actual per acre in a spray volume of 38 gallons per acre. Spray hood constants required to deliver the above volume are as follows:

Belt speed _____ 2 m.p.h.
Air pressure _____ Adjusted to provide 38 g.p.a. delivery.
Nozzle tip _____ 8003E (provides uniform cross-section flat spray).

Formulations for spray applications (as used in the compositions for which data are set forth in the Table II hereinafter provided) are prepared in 50 ml. volumes with the following components:

Sixteen pounds per acre rate:
  (1) 2.48 grams compound.
  (2) 49 ml. acetone as solvent.
  (3) 1 ml. xylene-Atlox 3414 (surface-active emulsifier).

Eight pound per acre rate:
  (1) 1.24 grams compound.
  (2) 49 ml. acetone as solvent.
  (3) 1 ml. xylene-Atlox 3414 (surface-active emulsifier).

Compounds which are not available in sufficient quantity for machine spraying are applied by hand with a DeVilbiss atomizer.

Two weeks after treatment, an evaluation is made as to plant defoliation or chemical pinching.

TABLE II.—FUNGICIDAL ACTIVITY* OF THE COMPOUNDS OF THIS INVENTION

| Compound of Example— | Concentration of application (parts/million) | Organism contacted | | | |
|---|---|---|---|---|---|
| | | Fusarium oxysporium | Pythium debaryanum | Rhizoctonia solani | Sclerotium rolfsii |
| 1 | 50 | 30 | 10 | 10 | 10 |
| 2 | 50 | 10 | 80 | 70 | 70 |
| 3 | | | | | |
| 4 | 50 | 90 | 60 | 90 | 90 |
| 5 | 50 | 100 | 10 | 80 | 80 |
| 6 | 50 | 10 | 10 | 60 | 6 |
| 7 | 25 | 70 | 20 | 80 | 80 |
| 8 | 50 | 60 | 20 | 70 | 70 |
| 9 | 25 | 40 | 70 | 70 | 70 |
| 10 | 50 | 60 | 10 | 30 | 30 |
| 11 | 50 | 50 | 10 | 30 | 30 |
| 12 | 25 | 90 | 50 | 90 | 90 |
| 13 | 25 | 60 | 30 | 70 | 70 |
| 14 | 50 | 100 | 10 | 90 | 90 |

*Fungicidal activity is measured in percent effectiveness.

TABLE III.—PLANT GROWTH REGULANT ACTIVITY OF THE COMPOUNDS OF THIS INVENTION

| Compound of Example— | Concentration of application, lbs./acre | Plant species | Results |
|---|---|---|---|
| 2 | 16 | Cotton | 100% defoliation of the true leaves and cotyledonary leaves leaving a healthy stem and boll; i.e., mechanical harvesting aid. |
| 4 | 8 | do | Kill of the new terminal buds; an effect similar to that of the contact tobacco sucker control agents, i.e., a chemical pincher. |
| 5 | 16 | do | 100% defoliation of the true leaves and cotyledonary leaves leaving a healthy stem and boll; i.e., mechanical harvesting aid. |
| 6 | 8 | do | Do. |

From the data in Tables II and III, it will be noted that the 3-(4-methyl-3-cyclohexyl)butyl esters of the present invention have a broad range of fungicidal activity and exhibit plant growth regulant activity, such as cotton defoliation and chemical pruning of new terminal buds. They are effective in the fungicide tests against *Fusarium oxysporium*, a fungus representing a huge genus of plant disease organisms; *Pythium debaryanum*, an important disease which causes decay, damping off and storage rot of cotton and many other plants; *Rhizoctonia solani* and *Scelerotium rolfsii*, complex disease organisms which cause damping off of practically all crops. The compounds of this invention also show 100% defoliation of the true leaves and cotelydonary leaves of cotton plants, thus providing an aid to mechanical harvesting. Also, the compound of specific Example 4 shows debudding activity of new terminal buds of cotton plants, thus providing a method of growth control.

The compounds useful in practice of this invention, in exhibiting considerable fungicidal activity and plant growth regulant activity, are disclosed for use in various ways to achieve such utility. They can be applied per se as solids or in vaporized form, but are preferably applied as the toxic components in fungicidal and plant growth regulant compositions of the compound and a carrier. The compositions can be applied as dusts, as liquid sprays or as gas-propelled sprays and can contain, in addition to a carrier, additives such as emulsifying agents, wetting agents, binding agents, gases compressed to the liquid state, odorants, stabilizers and the like. A wide variety of liquid and solid carriers can be used in the fungicidal and plant growth regulant compositions. Non-limiting examples of liquid carriers include water; organic solvents such as alcohols, ketones, amides, and esters; mineral oils such as kerosene, light oils, and medium oils; and vegetable oils such as cotton seed oil. Non-limiting examples of solid carriers include talc, bentonite, diatomaceous earth, pyrophyllite, fullers earth, gypsum, flours derived from cottonseeds and nut shells, and various natural and synthetic clays having a pH not exceeding about 9.5.

The amount of the compounds of this invention utilized in fungicidal and plant growth regulant compositions will vary rather widely. It depends to some extent upon the type of composition in which the material is being used, the nature of the condition to be controlled, and the method of application (i.e., spraying, dusting, etc.). In the ultimate fungicidal and plant growth regulant composition, as applied in the field, active compound concentrations as low as 0.0001 weight percent of the total composition can be used. In general, compositions, as applied, containing about 0.05 weight percent active compound in either liquid or solid carrier give excellent results. In some cases, however, stronger dosages up to about 10 weight percent may be required.

In practice, fungicidal and plant growth regulant compositions are usually prepared in the form of concentrates, which are diluted in the field to the concentration desired for application. For example, the concentrate can be wettable powder containing large amounts of a compound of this invention, a carrier (e.g., attapulgite or other clay), and wetting and dispersing agents. Such a powder can be diluted prior to application, by dispersing it in water to obtain a sprayable suspension containing the concentration of active compound desired for application. Other concentrates can be solutions that can be later diluted, e.g., with kerosene. Thus, it is within the contemplation of this invention to provide fungicidal and plant growth regulant compositions containing up to about 80 percent, by weight of the composition of an active compound of this invention.

Accordingly, depending upon whether it is ready for application or it is in concentrated form, the contemplated fungicidal and plant growth regulant compositions contain between about 0.0001 percent and about 80 percent, by weight of the composition, of an active compound of this invention, and a carrier, liquid or solid, as defined hereinbefore.

Although the present invention has been described with preferred embodiments, it is to be understood that modifications and variations may be resorted to without departing from the spirit and scope of the invention, as those skilled in the art will readily understand.

What is claimed is:

1. A compound having the formula:

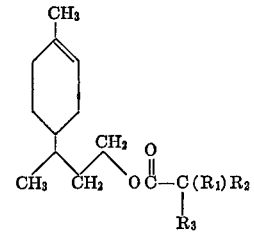

wherein $R_1$ and $R_2$ are selected from the group consisting of hydrogen and alkoxy of 1–4 carbon atoms and wherein $R_3$ is alkoxy of 1–4 carbon atoms.

2. The compound as defined in claim 1, wherein $R_1$ and $R_2$ are hydrogen, $R_3$ is —$OC_2H_5$.

3. The compound as defined in claim 1, wherein $R_1$ and $R_2$ are hydrogen, $R_3$ is —$OCH_3$.

References Cited

J. Org. Chem. 1968 33(7), 2991–3, Eng.

LORRAINE A. WEINBERGER, Primary Examiner

P. J. KILLOS, Assistant Examiner

U.S. Cl. X.R.

71—88, 106, 107, 108, 109; 260—347.4, 347.5, 348 A, 465.4 468 R, 468 H, 468 G, 468 K, 469, 473 G, 476, 478, 481 R, 482 R, 483, 485 L, 486 R, 486 H, 487, 488 R; 424—305, 308, 311, 313, 314

PO-1050
(5/69)

UNITED STATES PATENT OFFICE
CERTIFICATE OF CORRECTION

Patent No. 3,773,824    Dated Nov. 20, 1973

Inventor(s) Jerry G. Strong

It is certified that error appears in the above-identified patent and that said Letters Patent are hereby corrected as shown below:

In column 5, line 8, after "for" insert -- the --.

In column 5, lines 49 and 53, "trans" should be underlined.

In column 5, line 55 "trans" should be underlined.
In column 6, line 16, "%" should be -- g. --.
In column 6, line 48, before "4" insert -- ( -- (parenthesis).
In column 7, Ex. 14, second instance "(m" should be -- (m) --.
In column 7, line 16, after "In" cancel "the" .
In column 8, line 37, "pound" should be -- pounds --.
In column 8, Table 2, Ex. 6, under Sclerotium rolfsii "6" should be -- 60 --.
In column 8, line 52, in heading "Scelerotium" should be -- Sclerotium --.

Signed and sealed this 20th day of August 1974.

(SEAL)
Attest:

McCOY M. GIBSON, JR.
Attesting Officer

C. MARSHALL DANN
Commissioner of Patents